United States Patent
Atkinson et al.

[15] 3,675,796
[45] July 11, 1972

[54] FILL PIPE FOR SILO

[72] Inventors: James D. Atkinson, R.D. 3, Wooster, Ohio 44691; James W. Lepley, R.D. 1, Smithville, Ohio 44677; Claire E. Nussbaum, R.D. 1, Orrville, Ohio 44667; John E. Stolzfus, R.D. 1, Apple Creek, Ohio 44606

[22] Filed: March 8, 1971
[21] Appl. No.: 122,044

[52] U.S. Cl. ............................................. 214/17 C, 302/60
[51] Int. Cl. ......................................................... B65g 65/32
[58] Field of Search .................................. 214/17 C; 302/60

[56] References Cited

UNITED STATES PATENTS 3,105,722  10/1963  Thompson ............................... 302/60
3,582,145  6/1971  Janssen ............................... 214/17 C X

*Primary Examiner*—Robert G. Sheridan
*Attorney*—C. Hercus Just

[57] ABSTRACT

A fill pipe assembly adapted to be connected to a silo and extend from the top thereof to the lower portion for connection to a blower or the like by which the silo is filled with silage, etc. The upper end of the fill pipe has a laterally extending discharge structure and the invention primarily comprises the provision of suitable pivots and brackets which are axially aligned and intermediately spaced between the upper and lower ends of the conduit, whereby the conduit may be oscillated to move the lateral discharge extension in a to and fro pattern to move evenly distribute the discharged material in the silo than under circumstances where no pivoting of the fill pipe is possible.

10 Claims, 18 Drawing Figures

INVENTORS
JAMES D. ATKINSON
JAMES W. LEPLEY
CLAIRE E. NUSSBAUM
JOHN E. STOLTZFUS

ATTORNEY

INVENTORS
JAMES D. ATKINSON
JAMES W. LEPLEY
CLAIRE E. NUSSBAUM
JOHN E. STOLTZFUS

BY
ATTORNEY

INVENTORS
JAMES D. ATKINSON
JAMES W. LEPLEY
CLAIRE E. NUSSBAUM
JOHN E. STOLTZFUS
BY
ATTORNEY

FILL PIPE FOR SILO

BACKGROUND OF THE INVENTION

The filling of silos normally occurs by means of a vertically extending fill pipe which is connected by various types of relatively unsatisfactory means so as to extend from the top of the silo to a location adjacent the bottom thereof. The lower end of the fill pipe or conduit is connected to a suitable agricultural blower by means of which chopped silage and the like is blown by means of an air current up the conduit and into the top of the silo. Under most circumstances, the conduit is of a stationary type. A number of those now in use have permanent type brackets which clamp the conduit in fixed relationship to the exterior of the silo wall. If it is desired to oscillate such conduit, it is necessary to loosen the outer clamp of each of the clamping brackets in order to allow rotatable movement of the conduit or fill pipe in filling operations.

Particularly in view of the fact that many types of modern silos are relatively high, loosening of the clamping members of the aforementioned brackets is difficult to achieve and is actually somewhat dangerous. Such operation is also very time consuming. Further, such loosening of the clamping brackets results in the blower conduit being relatively unsupported, at least in vertical direction, during operation.

One existing attempt to provide a movable type of blower pipe or conduit consists of an oval shaped bracket strap structure having an outer chain which extends around the blower conduit. Such an arrangement is unsatisfactory since it results in constant maintenance and replacement of blower conduits due to wearing of the same where it is engaged by such chains, and cracking of the flanges which connect the sections of the blower conduit also is a constant source of difficulty and irritation.

SUMMARY OF THE INVENTION

It is the principal object of the present invention to provide a fill pipe or conduit assembly adapted to be connected to a silo along the exterior wall thereof and extend from the upper end of the silo where laterally extending discharge structure is provided to extend into the silo, the principal feature of the present invention comprising pivot means for the fill conduit which extend from the upper end of the conduit to the lower end thereof and intermediately inbetween, the uppermost pivot being adjacent the wall of the silo but the fill conduit being laterally spaced therefrom, and the lower end of the fill conduit is substantially spaced from the wall of the silo but mounted within an annular bearing directly surrounding the lower end portion of the fill conduit. Intermediate bracket means are disposed in vertically spaced relationship to the pivot and bearing means at the opposite ends of said conduit and are provided with pivot means which are in axial alignment with the upper pivot means and the lower bearing means, whereby oscillation of the fill conduit is possible in a manner which is relatively safe for the operator and is free from possible injury to the fill conduit, while providing ample to and fro movement of the lateral extension at the upper end of the fill conduit so as to distribute the material being delivered to the silo in a relatively even manner across the inner area thereof.

It is another object of the invention to provide a plurality of supporting brackets which are intended to be mounted in fixed relationship to the exterior surface of a silo wall for purposes of permanently connecting the fill conduit thereto.

A further object of the invention is to provide pivot means in the various supporting brackets which are relatively simple but durable and capable of long life as well as being connectable by simple means to the conduit incident to supporting the same permanently with respect to a silo.

Details of the foregoing objects and of the invention, as well as other objects thereof, are set forth in the following specification and illustrated in the accompanying drawings comprising a part thereof.

DESCRIPTION OF THE PREFERRED EMBODIMENTS

Figure 1:
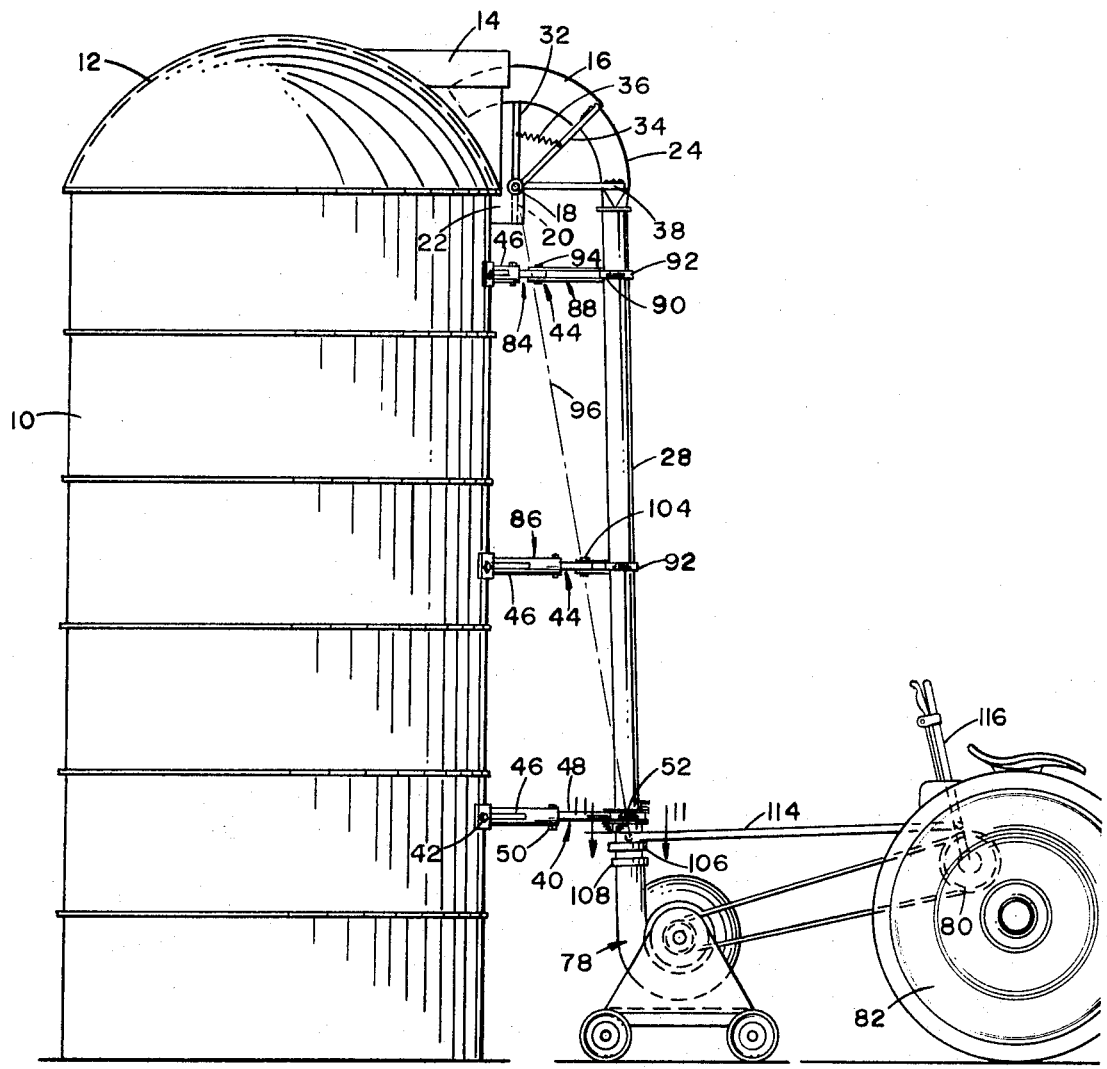
FIG. 1 is a vertical elevation of an exemplary silo and fill conduit attached thereto which embodies the principles of the present invention.
Figure 10:
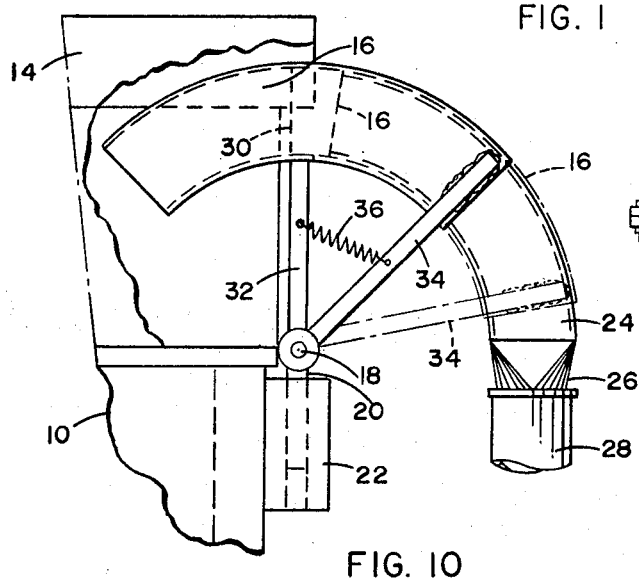
FIG. 10 is a fragmentary, enlarged side elevation of the upper discharge end of the fill conduit shown in FIG. 1.

Referring particularly to FIG. 1, an exemplary silo 10 is illustrated which may be of any type commonly in use. The same is provided with a conventional cap or roof 12 having an inlet dormer 14 into which a laterally extending inlet member 16 is adapted to be projected by movement about a transverse pivot 18 carried by a vertically extending pivot member 20 which is best shown in FIG. 10. The pivot member is supported with a suitable bearing 22 which, in conjunction with the pivot member 20, comprises upper pivot means.

The bearing 22 is fixedly connected to the upper end portion of the silo 10 on the exterior surface of the wall thereof, by any suitable means. Laterally extending inlet member 16 also is arcuate and is arranged to telescope with a companion arcuate member 24, the lower end of which is connected by an adaptor 26 to the upper end of a vertically extending fill pipe or conduit 28. The preferred configuration of fill pipe conduit 28 is cylindrical but the invention is not intended to be restricted to such geometrical shape. If desired, the inlet member 16 and companion arcuate member 24 may be of substantially the same length. Inlet member 16 is adapted to be moved from the inoperative phantom position shown in FIG. 10, wherein the outer end thereof is disposed inwardly of the inlet dormer 14.

The arcuate member 24 has an upper end 30 which discharges into inlet member 16 when the same is in its extended, full line position shown in FIG. 10. Said upper end 30 of member 24 is supported by a vertical strut 32 which extends upwardly from the bearing which supports the transverse pivot 18. Said bearing is supported by vertical pivot member 20. If desired, a pair of struts 32 may be employed which are spaced apart substantially to the extent of the width of the member 24 and under such circumstances, the inlet member 16 may be U-shaped in cross-section, comprising a pair of parallel arcuate sides connected by a curved upper sheet of metal, whereby the sides may slidably move with respect to the vertical struts 32 which support the upper end of arcuate member 24.

The inlet member 16 slidably moves for guiding movement upon the exterior surfaces of member 24. Such movement is controlled by a pair of struts 34 which also are pivotally connected for movement about the axis of transverse pivot 18 between the full line and dotted or phantom position thereof shown in FIG. 10. The outer ends of the struts 34 are fixedly connected to the opposite sides of member 16 and movement-inducing springs 36 extend between the fixed struts 32 and the movable struts 34 so as to facilitate the movement of the member 16 to its extended, operative position in which the same projects laterally into the upper portion of the silo 10, or at least into the roof portion 12 thereof, considering that the inlet dormer 14 is part of the roof structure. Any suitable means, not shown, such as a pull rope or chain, may be affixed to the lower end portion of the member 16 to move it to retracted position shown in phantom in FIG. 10. If desired, an additional fixed, transversely extending pair of struts 38 may be connected between the bearing for transverse pivot 18 and the arcuate member 24, as shown in FIG. 1.

Figure 5:
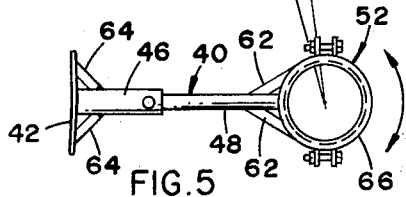
Figure 8:
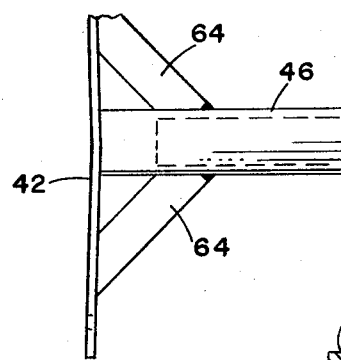
FIG. 8 is a view similar to FIG. 7 but showing the lowermost bracket means corresponding to that shown in FIG. 5.
Figure 9:
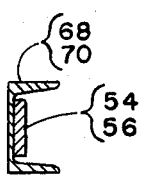
FIG. 9 is a fragmentary sectional view of a detail taken on the line 9—9 of FIG. 8.

As indicated above, the bearing 22 and the vertical pivot member 20 may be considered upper, or uppermost, pivot means for supporting the vertical fill pipe or conduit 28. In addition, the fill conduit 28 also is provided with lowermost bracket means 40 which, in its operative relationship with respect to conduit 28, is shown in FIG. 1 and details thereof are best shown in FIGS. 5, 8 and 9. Said bracket means comprises base member 42 which, preferably, is suitably shaped to be sufficiently arcuate to conform to the exterior circumference of the wall of the silo 10.

Figure 12:
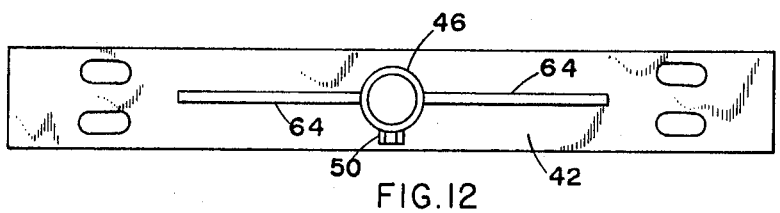
FIG. 12 is an enlarged plan view of a base member of the brackets of the types shown in FIGS. 2 - 8.

In horizontal plan view, said base member 42 is shown in FIG. 12 and in vertical plan view, it is best shown in FIGS. 5 and 8. The bracket means 40 also comprises transversely extending arm means 44 which, specifically, includes a pair of longitudinally adjustable sections 46 and 48 which, preferably, are telescopically adjustable relative to each other. For example, the section 46 is tubular and section 48 is a rod, or said section may be tubular, which is received within the section 46. An appropriate set screw or bolt 50 may be utilized to maintain any longitudinally adjusted position of said sections when connected together in desired longitudinally adjusted position which is required to dispose the annular or ring bearing 52, which is supported by the outer end of arm means 44, for connection to the lower end portion of the fill conduit 28, as shown in FIG. 1.

When a fill conduit is being mounted permanently with respect to a given silo, if desired, instead of using a set screw or bolt 50, an appropriate bolt may be inserted through holes transversely drilled through section 46 and 48 when an operative position has been established between the silo and bearing 52.

Figure 15:
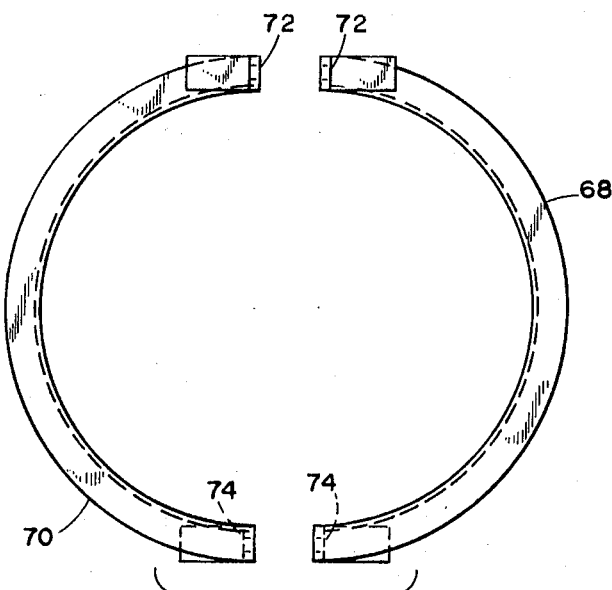
FIG. 15 is an exploded plan view showing two sections of a portion of the bearing structure of the bracket shown in FIGS. 5 and 8.
Figure 16:
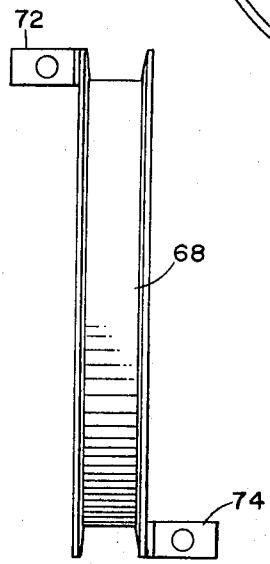
FIG. 16 is a side elevation of the bearing structure shown in FIG. 15 as seen from the right-hand side thereof.
Figure 17:
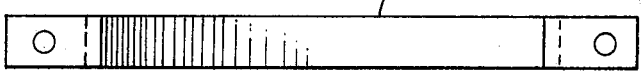
FIGS. 17 and 18 respectively are side elevation and plan views of outer clamping members adapted to be connected to the clamping member shown in FIGS. 13 and 14.
Figure 18:
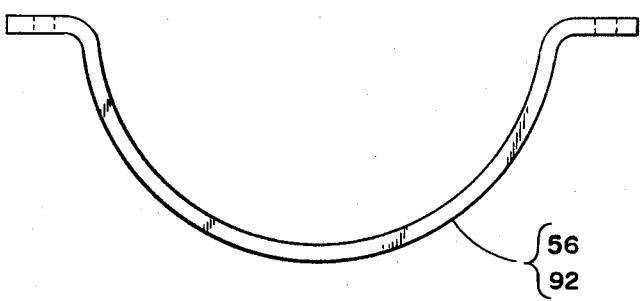

In accordance with the preferred arrangement of the invention, the bearing 52 surrounds the fill conduit 28 so that said lower end thereof oscillates about the axis of the bearing 52. Accordingly, a suitable detailed structure of said bearing which is inexpensive to produce is shown in FIGS. 8, 15 and 16. Said bearing actually comprises two parts. One of these is a cylindrical strap member comprising similar, bi-partite arcuate strap members 54 and 56 which have laterally extending ears 58 on the opposite ends thereof which are connected by appropriate clamping bolts 60. The arcuate member 54 is fixed to the outer end of arm section 48 of bracket means 40 and, if desired, may be strengthened by angular braces 62, which may be affixed by welding the opposite ends thereof respectively to the strap member 54 and arm section 48. Likewise, similar braces 64 may extend between, and be welded at opposite ends to, base means 42 and arm action 46, as best shown in FIG. 8.

Rotatably supported by the connected arcuate strap members 54 and 56 is an annular channel-shaped bearing member 66 which comprises a pair of similar semi-circular channel members 68 and 70, details of which are best shown in FIGS. 15 and 16. The arrangement by which the channel members 68 and 70 are supported by the connected strap members 54 and 56 is shown in detail in FIG. 9.

Referring to FIGS. 15 and 16, it will be seen that the channel members 68 and 70 are each provided with complementary, perpendicularly extending ears 72 and 74 which are parts of right-angled brackets, the other legs of which are secured, by welding, respectively to the upper and lower flanges at opposite ends of the arcuate channel members 68 and 70. Appropriate clamping bolts 76 extend through axially aligned holes in the ears 72 and 74 and thereby effect firm clamping of the channel members in rigid manner to the exterior surface of the lower portion of the fill conduit 28.

It will be understood that the bolts 60 which connect the arcuate strap members 54 and 56 around the assembled channel members 68 and 70 are tightened only sufficiently to effect accurate positioning of the strap members in slidable rotary relationship with respect to the channel members. If desired, suitable spacing means, not shown, may be disposed between the ears 58 at opposite ends of the archate strap members 54 and 56 to effect such desired freedom of movement and spacing between the two circular components comprising the annular bearing 52 which supports the lower end portion of the fill conduit in laterally spaced relationship with respect to the exterior wall of the silo 10. Such spacing is desirable for purposes of readily accommodating blower means 78, or other equivalent propelling means, by which silage and similar material is forced upwardly through the fill conduit 28 and into the silo 10. The blower means 78 may be driven by an appropriate p.t.o of a tractor 82, as illustrated in exemplary manner in FIG. 1.

From the foregoing, it will be seen that the upper and lower end portions of the fill conduit 28 are pivotally supported respectively by the upper pivot means 20, 22 and the annular bearing 52. In view of the fact that it is not uncommon for fill conduits 28 to be of the order of 50 or 60 feet or more in length, it normally is found necessary to provide additional bracket means which are spaced vertically apart at appropriate distances from each other and from the upper and lowermost pivot and bearing means described above. As will be seen in FIGS. 1 – 5, two such additional bracket means 84 and 86 are provided by the present structure. Details of the same respectively are shown in FIGS. 6 and 7 in which assemblies are illustrated, while additional details are shown in FIGS. 12 – 14, 17 and 18.

Figure 6:
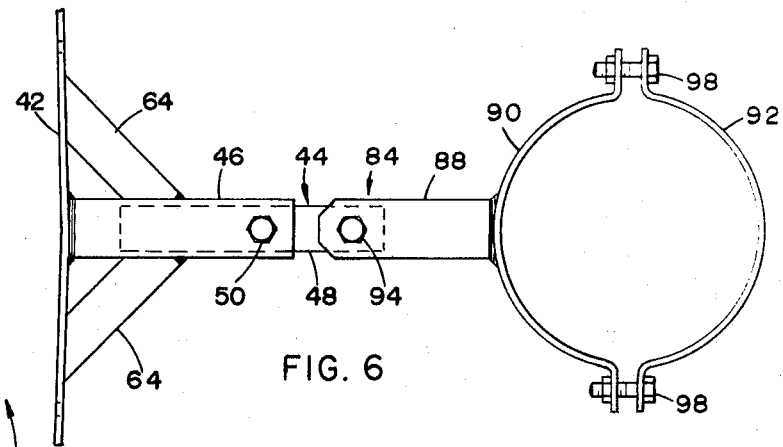
FIG. 6 is an enlarged plan view of one of the intermediate bracket structures corresponding with that shown in FIG. 3.
Figure 3:
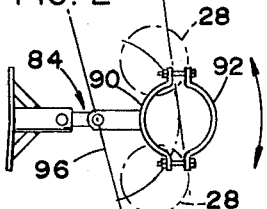
Figure 4:
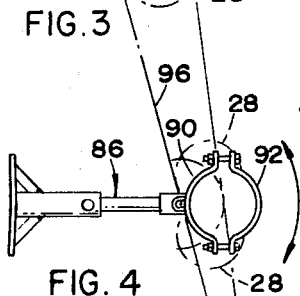
Figure 7:
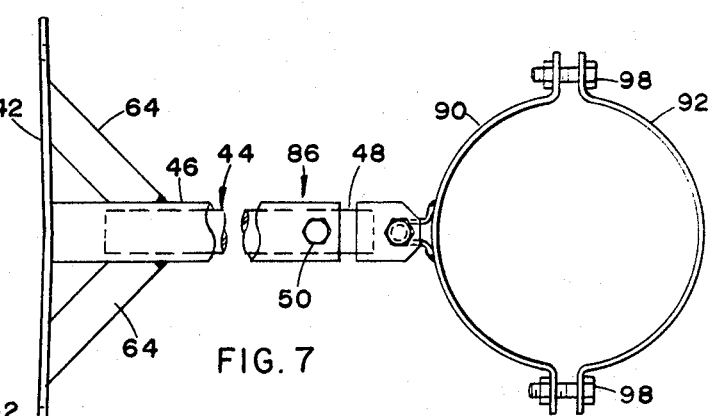
FIG. 7 is a foreshortened plan view of another exemplary intermediate bracket structure, shown on a larger scale than shown in FIG. 4 but corresponding to the bracket shown therein.

Referring to the uppermost of the additional bracket means 84, which is slightly shorter than the other illustrated additional bracket means 86, attention is directed particularly to FIG. 6 in which it will be seen that the bracket means 84 include a base member 42 corresponding to the similar brace means shown in FIG. 8 with respect to lowermost bracket means 40. Also, arm means 44 is of an articulated nature, comprising arm sections 46 and 48. Preferably, arm section 46 is tubular and arm section 48 is a rod or tube, telescopically received within section 46 for suitable adjustable positioning by means of set screw or transverse bolt 50, as desired.

Rather than the arm section 48 being directly connected to means which engage the fill conduit 28, an additional bracket member 88, which may be U-shaped in vertical elevation, not shown, is connected at the bight portion thereof to one arcuate clamping member 92. The connection may be effected suitably by a weldment. The additional bracket member 88 is connected to the outer end of arm section 48 by an appropriate pivot bolt 94. The axis of said bolt is disposed in axial alignment with the upper pivot means 20, 22 and the annular bearing 52 along a straight line of pivot axes 96 shown in continuous manner in FIG. 1 and in interrupted manner in FIGS. 2 – 5.

The complementary arcuate clamping members 90 and 92 are securely clamped around the fill conduit 28 intermediately of the ends thereof, as shown in FIG. 1, the opposite ends of said members having laterally extending ears which are provided with axially aligned holes to receive clamping bolts 98. By such means, the outer end of the upper additional bracket means 84 is securely connected at its outer end to the fill conduit, while the opposite end thereof, comprising base means 42, is fixedly connected to the silo wall. If desired, suitable angular braces 64 likewise may be employed between base means 42 and arm section 46 as in regard to the lowermost bracket means 40 described hereinabove.

Referring particularly to FIGS. 4, 7, 13, 14, 17 and 18, wherein the lower additional bracket means 86 is illustrated in various degrees of detail, it will be seen that the same also comprises base means 42 which is fixedly attachable to the wall of the silo and composite arm means 44 which extends between base means 42 and the outer composite clamping means 90 and 92 which are similar to those shown, for example, in FIG. 6. Arm means 44 includes arm sections 46 and 48 which are telescopically related and may be longitudinally adjusted and maintained by a set screw or bolt 50 as in relation to the upper additional bracket means 84 shown in detail in FIG. 6. Brace means 64 also may be employed between base means 42 and arm section 46. The pivotal support for the arcuate clamping members 90 and 92 is different from that shown in relation to bracket means 84, however, such details being as follows.

Figure 13:
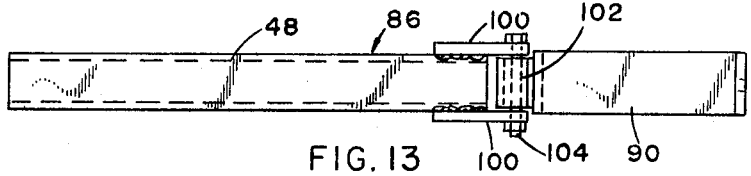
FIG. 13 is a side elevation of exemplary arm means located between the base and clamping members of the brackets shown in FIGS. 4 and 7.
Figure 14:
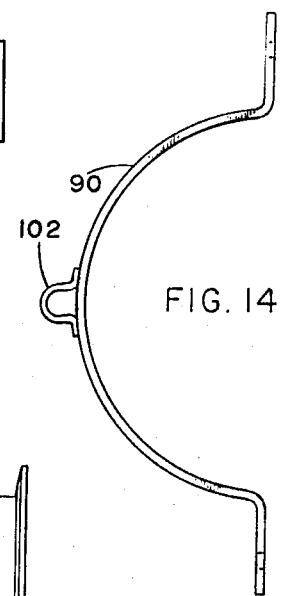
FIG. 14 is a plan view of part of the clamping means of the bracket shown in FIG. 13.

As will be seen best from FIGS. 13 and 14, the arm section 48 of additional bracket means 86, if desired, may be tubular, rather than a solid rod, and a pair of pivot plates 100 are fixed by welding or otherwise to the outer end thereof. The arcuate clamping member 90 is provided with a bearing strap or loop 102 to receive a pivot bolt 104 which extends through a pair of axially aligned holes in the pivot plates 100. Sufficient clearance is provided between the bolt 104 and bearing loop 102 to permit ready pivotal movement of the connected clamping members 90 and 92 which fixedly encircle and are clamped to the fill conduit 28. As will be seen readily from FIGS. 1 – 5, the axis of pivot bolt 104 is disposed within the straight line of pivot axes 96.

From the foregoing, it will be seen that, in view of the fact that the upper pivot means 20, 22 and the additional pivots provided by pivot bolts 94 and 104, as well as annular bearing 52, are all disposed along a straight line of pivot axes 96, the fill conduit 28 may be oscillated along the pivot line 96 for purposes of oscillating the outer end of laterally extending inlet member 16 at the upper end of conduit 28 and thereby provide means for substantially evenly distributing the material discharged into the silo from said conduit and discharge end 16.

Figure 11:
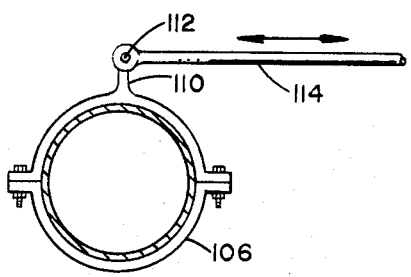
FIG. 11 is an enlarged fragmentary sectional view of the fill conduit as seen on the line 11—11 of FIG. 1 and showing exemplary oscillatory structure.
Figure 2:
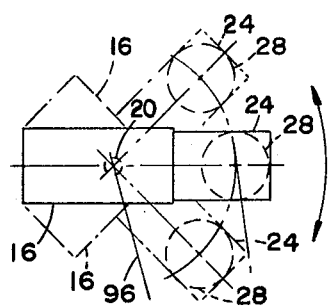
FIGS. 2, 3, 4 and 5 respectively are exemplary, somewhat diagrammatic, plan views of vertically spaced sections of the fill conduit shown in FIG. 1 and illustrating specific types of supporting brackets and pivots by which the conduit is arranged for oscillatory movement along a straight line of axes of said various pivots and bearings.

Any suitable means desired may be utilized, either of a manual or power-operated nature to effect such oscillation. One exemplary appropriate means is illustrated in FIGS. 1 and 11, wherein it will be seen that a clamping collar 106 is connected to the lower end portion of fill conduit 28, above the exemplary, conventional rotary joint 108 which is provided between the lower extremity of fill conduit 28 and the upper end of the discharge port of the blower means 78 as shown in FIG. 1. Clamping collar 106 has a laterally extending arm 110 connected thereto and the outer end thereof is connected by an appropriate pivot pin 112 to one end of a reciprocating link 114.

Referring to FIG. 1, it will be seen that the opposite end of the link 114 may be secured to any appropriate manually operable lever 116 which may be oscillated by an operator seated upon the tractor 82, or the link may be operated by appropriate power-actuated means such as a crank pin, not shown, driven by the power means of said tractor. Such oscillating movement of the fill conduit 28 may be at a relatively slow speed but the same should be regulated in accordance with the rate of delivery of material through the conduit by the blower means 78 or the like.

From the foregoing, it will be seen that the present invention provides means by which a vertically extending fill pipe or conduit may be permanently secured to the exterior of a silo by bracket means which safely supports the conduit upon the silo, while simultaneously providing pivot means which permit oscillating movement of the laterally extending projection at the upper end of the conduit, thereby offering substantial improvements over devices presently in use for supporting fill pipes or conduits upon silos.

While the invention has been described and illustrated in its several preferred embodiments, it should be understood that the invention is not to be limited to the precise details herein illustrated and described since the same may be carried out in other ways falling within the scope of the invention as illustrated and described.

We claim:

1. A fill pipe assembly adapted to be connected to a silo adjacent the exterior wall thereof and comprising in combination, an elongated tubular conduit having a laterally extending discharge end structure directed toward the axis of the top of said silo, upper pivot means adapted to be fixedly connected to the upper portion of a silo adjacent the wall thereof, uppermost bracket means connected to said pivot means and extending laterally therefrom to the upper end of said conduit and connected thereto, lowermost bracket means adapted to be fixedly connected at one end to said silo wall adjacent the lower end thereof and the opposite end having a bearing surrounding the lower portion of said conduit to support the same in substantially spaced relation to said silo wall, and additional bracket means spaced intermediately between said uppermost and lowermost bracket means and connectable at one end to said silo wall and the other end being fixedly connected to said conduit, said additional bracket means being articulated and having pivot means intermediate the ends thereof in axial alignment with the axes of said upper pivot means and the bearing of said lowermost bracket, whereby said conduit may be oscillated about said aligned axes to effect arcuate oscillation of the discharge end structure of said conduit to produce to and fro discharge of silage therefrom.

2. The fill pipe assembly according to claim 1 in which said additional bracket means is provided with base means at one end attachable to the sidewall of the silo, clamping means at the outer end of said bracket means connected to said conduit, and arm means extending between said base means and clamping means and comprising two sections connected together by a pivot having a substantially vertical axis.

3. The fill pipe assembly according to claim 2 in which one of said sections of said arm means is longitudinally adjustable.

4. The pipe fill assembly according to claim 3 in which said longitudinally adjustable section is provided with telescoping portions and means to secure the same in longitudinally adjusted position.

5. The pipe fill assembly according to claim 2 in which the clamping means at the other end of said additional bracket means comprises a clamping band surrounding the conduit and tightly clamped thereto.

6. The fill pipe assembly according to claim 1 in which the lowermost bracket means is provided at one end with a base attachable fixedly to the exterior surface of a silo wall and the opposite end thereof having a ring bearing supported thereby, said ring bearing being coaxial with and surrounding said conduit.

7. The fill pipe assembly according to claim 6 in which said ring bearing is composite and comprises separable portions of a circular band, and an annular channel rotatably supported within said circular band, said channel being clamped to said conduit.

8. The fill pipe assembly according to claim 7 in which said annular channel comprises two similar sections having laterally extending annular flanges and one of said flanges being provided with ears extending perpendicularly to the plane of the flanges adjacent the ends of said sections, the ears of said sections being adapted to abut each other along planes extending perpendicularly to the axis of said conduit, and connecting means extending through said ears to securely clamp said annular channel sections to said conduit.

9. The fill pipe assembly according to claim 6 further including actuating means connected to and projecting radially from the lower end portion of said conduit and operable to effect oscillation of the conduit about the axes of the aligned pivot means and bearing interconnected to said conduit and thereby permit axial oscillation thereof about a straight line extending vertically between the upper and lower portions of a silo when said conduit is connected thereto.

10. The fill pipe assembly according to claim 9 in which said actuating means comprises an articulated band which surrounds and is clamped to the lower portion of said conduit, said band comprising a plurality of similar arcuate sections and one of said sections having a lateral projection extending therefrom for the application of oscillating force thereto.

* * * * *